United States Patent Office 3,069,875
Patented Dec. 25, 1962

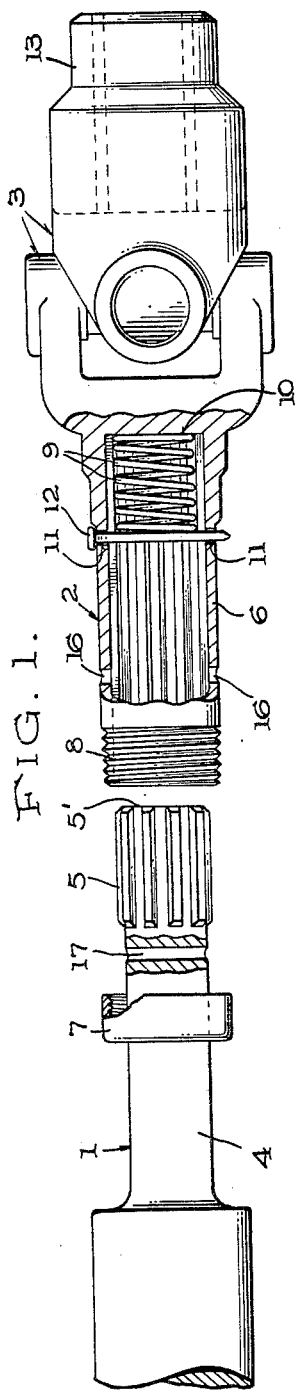
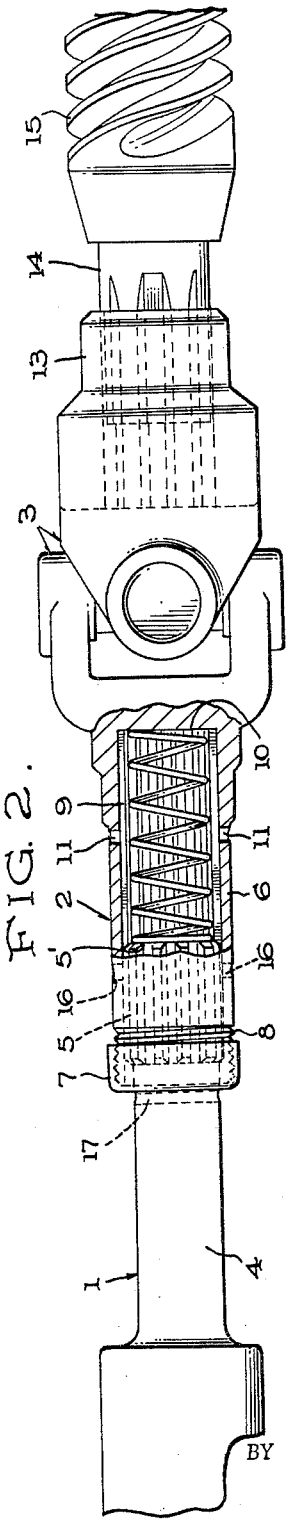
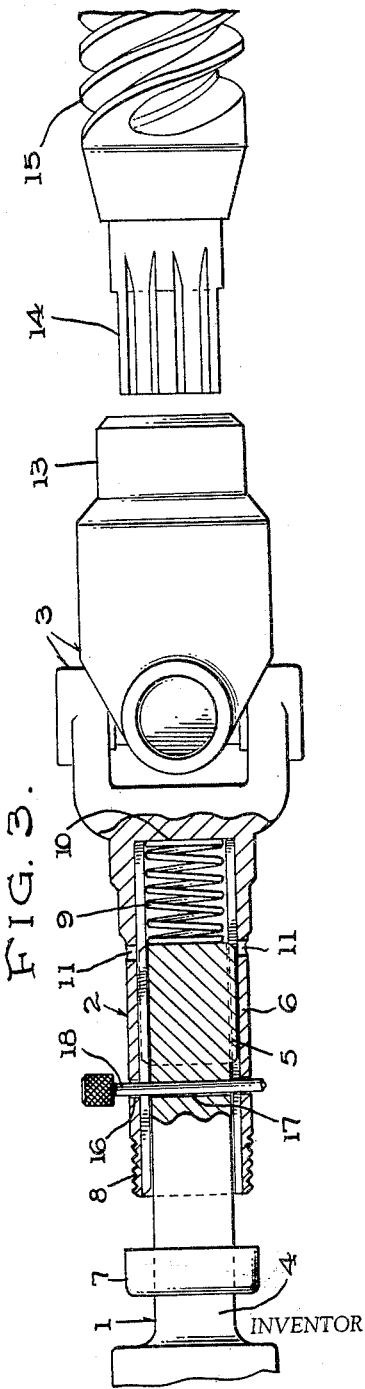

3,069,875
QUICK-CHANGE UNIVERSAL DRIVE SHAFT
Joe Crum, Jr., West Logan, W. Va., assignor to Logan Gear Company, Inc., West Logan, W. Va., a corporation of West Virginia
Filed Mar. 26, 1962, Ser. No. 182,381
5 Claims. (Cl. 64—23)

The present invention relates to drive shafts and, more particularly, to a compressible and extensible drive shaft construction which is adapted to permit simple and quick installation and/or interchange of drive shafts of the type generally used in connection with mobile mining machinery, vehicles and various other kinds of industrial equipment.

The invention is especially concerned with improvements in drive shafts for independently driven wheeled mining machinery and equipment, such as coal and other ore-handling shuttle cars and the like wherein an electric drive motor or other suitable source of power is mounted on each side of the vehicle or machine to drive the same through individual wheel drive units, said units including at least two or more wheels on each side of the vehicle or machine. However, it is to be understood that while the invention is particularly intended for use with mine machinery and equipment, it is equally adaptable for use in connection with many other vehicles and other types of equipment in which power is transmitted from a driving member to a driven member.

In the past, many of the ore-carrying mining vehicles, more commonly known as shuttle cars, have utilized a standard and comparatively rigid type of universal drive shaft assembly for transmitting the driving power from one individual wheel drive unit to another. These wheel drive units are usually fixedly mounted on the vehicle in spaced relation, with the spacing varying from several inches apart up to several feet apart, depending upon the size and type of the particular vehicle. These drive shafts are axially incompressible or non-contractable when assembled between the fixed driving and driven elements, and are usually provided with standard universal joints on each end thereof, said joints including a separable two-piece flanged coupling component. Each of these two-piece coupling components generally comprises a flanged yoke element which is a part of the universal joint per se, and a separate complementally flanged and preferably internally splined sleeve element adaptable for cooperative connection with either of the complementally splined drive or driven elements which are to be interconnected by the drive shaft.

In order to mount these drive shaft for such use, the two-piece flanged coupling components have to be first disassembled by removing four or more bolt and nut assemblies. After being unbolted and disassembled, that part of the coupling which includes the splined sleeve element is then cooperatively interconnected with the splined stub drive shaft which projects from each of the fixed wheel drive units. Two or more cap screws are then used to secure a cap or end piece, seating in a recess within the flange of each of the latter mentioned coupling elements, to the adjacent fitted free end of the respective stub shafts to hold the respective flanged coupling elements on said stub shaft. Following this, the flanged yoke elements of each of the coupling and universal joints then have to be rebolted respectively to the flanged sleeve elements to finally assemble the drive shaft in an operative position.

Further still, in order to keep the bolts and the flanges themselves from working loose under the constant and severe usage which they inherently undergo in mines, the maintenance personnel usually make it a practice to either spot or seam-weld the flanges of the two-piece components together, as well as weld the connecting bolt assemblies thereof. Despite the purposes and advantages of this practice, it has proven very unsatisfactory because if a wheel drive unit has to be removed for any reason, or if the drive shaft itself becomes damaged, necessitating its removal and replacement, the welded drive shaft then has to be cut off at both ends, thus destroying it for further use.

Even where the flanges aforementioned have not been welded, in addition to the connecting bolts, the removal or disassembly process, which is the reverse of the assembly process, is both lengthy and tedious. Where mining machinery of this type is provided with four individual wheel drive units, with one motor driving two of the units on each side thereof, the vehicle often can still operate with only three, or possibly even two, of the wheel drive units working if one of two of the units should fail. Because a valuable and considerable amount of production time is lost during removal or disconnection of a wheel drive unit or a drive shaft of the aforementioned type, as extensively used in mines, the production personnel often continue to operate the equipment with only some of the wheel drive units working. The result is that the drive shaft from the operating wheel unit continues to transmit power to the still-connected but inoperable wheel drive unit, thereby seriously damaging or destroying the internal gearing mechanism thereof to such an extent as to require even more extensive and expensive repairs and loss of time than if the inoperable wheel drive unit or its drive shaft had been disconnected immediately after failure or damage occured.

In view of the foregoing disadvantages attending many current mining operations, it is one object of this invention to provide an improved power transmitting drive shaft which is adapted for quick assembly and disassembly between driving and driven elements of a power transmission system, and especially under conditions of limited or extremely cramped spaced where the equipment is being used.

More specifically, the primary object of this invention is to provide an improved telescopic spring-loaded drive shaft preferably having one or more universal couplings formed as a unitary part thereof, and which can be quickly installed or removed for replacement or repair with a minimum of effort and preferably without the aid of special tools.

Another object is to provide a durable and efficient quick-change universal drive shaft as aforementioned which essentially comprises spring-loaded male and female telescopic components, said components having means for selectively maintaining the spring in a collapsed or compressed condition while the components are either assembled or disassembled, as well as allowing the spring to expand after assembly of the components and installation of the drive shaft in power transmitting relation to the driving and driven elements of the machine or equipment with which the drive shaft assembly is to be used.

Other and further objects and advantages of the invention will become apparent from the following description and the accompanying drawing, and the novel features thereof will be defined in the appended claims.

In the drawing:

FIG. 1 is a view partly in elevation and partly in cross section of one typical embodiment of my improved drive shaft as shown with the male and female telescopic components thereof disassembled, and with the loading spring fully compressed and restrained in such compressed condition;

FIG. 2 is a view generally similar to FIG. 1, with the telescopic components assembled in working condition, with the loading spring released so as to yieldingly maintain operative connection of the drive shaft assembly with a driven worm as utilized in certain conventional mining equipment; and FIG. 3 is another view generally similar to FIG. 2, but with the telescopic components of the drive shaft assembly contracted and selectively restrained in such contracted condition against the pressure of the loading spring which is shown in a compressed position, as in preparing to remove the drive shaft assembly, or in partially disconnecting the drive shaft assembly from the power transmission system.

Referring to the drawing which is illustrative of one practical embodiment of my invention, it will be observed that my improved shaft assembly comprises essentially a male component designated 1 and a female component designated 2, these components having telescopic relation to one another when assembled, and also having provision for positive interconnection with each other so that rotary motion of one component will be imparted to the other in transmitting power from a driving member to a driven member when the latter members are interconnected by the shaft assembly.

At least one of the drive shaft components is preferably provided on its outer end with a universal joint designated 3, said universal joint being of any suitable construction, but preferably forming a unitary part of the shaft component. In the drawing, the universal joint 3 is carried by the female shaft component 2, but it is to be understood that it may be alternatively or additionally duplicated on the outer end of the male shaft component 1, if desired, in order to facilitate quick connection of the shaft component 1 to an appropriate rotary element (not shown).

Considering the foregoing components in more detail, it will be seen that the male shaft component 1 includes an axially extended stub shaft 4 of any suitable length, said stub shaft terminating in a splined head 5 at its inner end, said splined head 5 being freely insertable and slidable into the female shaft component 2 which preferably has the form of an axially extended sleeve 6 of appropriate length, with the sleeve being internally splined for cooperative mating engagement with the splined head 5 on the male shaft component 1.

When the shaft components are telescopically fitted together, dirt, dust, and other foreign matter is prevented from gaining access to the splined portions of the respective shaft components by use of an internally threaded cap designated 7 which is snugly fitted on the shank 4 of the male shaft component 1, behind the splined head 5, and the cap 7 is threadedly engaged with the threads 8 which are provided exteriorly on the end of the sleeve 6 of the female shaft component 2 at the open end of the latter through which the splined head 5 is passed into the sleeve 6 during assembly of the drive shaft. By applying an adequate and plentiful supply of lubricant on to the splines before or during assembly of the drive shaft components, the cap 7 will thereafter serve as an effective lubricant or grease retainer so as to prevent appreciable loss of the lubricant or grease.

During assembly of the shaft components 1 and 2, and prior to insertion of the splined head 5 into the internally splined sleeve 6, a coiled expansion spring designated 9 is inserted in the sleeve 6 of the female shaft component 2, with the innermost end of the spring seating against an end wall 10 at the extreme inner end of the sleeve, said end wall 10 preferably being defined by the base of the universal joint 3 which forms a unitary part of the sleeve 6. Prior to installation or use of the drive shaft, and preferably during the course of its construction while adequate tools, presses, etc., are readily available, the coil spring 9 is preferably fully compressed axially, as illustrated in FIG. 1 of the accompanying drawing. Retention of the spring in such a fully compressed condition is achieved by providing a pair of diametrically opposed and transversely alined apertures 11, 11 through which a pin, nail, or other appropriate element 12 may be passed so as to extend diametrically across the coil spring in advance thereof so as to positively preclude expansion of the spring, and thus restrain its expansive force.

When my improved drive shaft is used in conjunction with mining machinery or equipment of the type hereinbefore referred to, the coil spring 9 preferably should have an expansive force on the order of from 50 to 75 pounds. Accordingly, it is considerably easier to compress the spring with the aid of a press or other appropriate tools while the latter are more readily available, than it is in the field where adequate tools are not always at hand, and under limited working space conditions which frequently prevail in mines. The male and female components of the drive shaft may therefore be left in freely separable condition, as shown in FIG. 1 of the drawing, until the shaft is ready to be installed, at which time, the male shaft component 1 is appropriately connected to one rotary member, such as a driving member (not shown), and the female shaft component 2, which carries the universal joint 3, is appropriately connected as by an internally splined socket 13 which is slidably applicable on to the splined stub shaft 14 of a driven worm 15 to which rotary motion is to be imparted through the drive shaft from the driving member previously referred to, to the worm 15 or other appropriate rotary part of any suitable power transmitting mechanism. When the shaft components have been preliminarily assembled with the driving and driven members as just described, with the components alined with each other, the spring retention pin 12 is then removed from the apertures 11, 11 so that the spring 9 will yieldingly bear against the end face 5' of the splined head 5 of the male shaft component 1, thereby yieldingly urging the drive shaft assembly to an axially extended condition, and with sufficient axial expansive pressure to maintain the operative connection between the drive shaft and the driving and driven members, as illustrated in FIG. 2 of the drawing.

In the use of my improved drive shaft, should it become desirable or necessary to free or disconnect one end of the drive shaft so as to allow servicing or repair of other parts of the machine or equipment with which my drive shaft is being used, the drive shaft can be contracted axially against the expansive force of spring 9 and held in such a contracted condition as shown in FIG. 3 of the drawing. To achieve this condition, the female shaft component is provided with a second pair of diametrically opposed and alined apertures 16, 16 which may be registered with a diametrically extended hole 17 through the shank 4 of the male shaft component 1. When so registered, a nail, pin or other appropriate instrumentality 18 can be inserted therethrough so as to positively hold the drive shaft in a contracted position, with the coil spring 9 fully or substantially completely compressed, and the force of the spring being restrained by the pin. When so contracted, the drive shaft will be disengaged from the worm 15, as illustrated, or if preferred, it can be disengaged from the mechanism with which it normally is connected at its opposite end. It is to be understood, of course, that either end of the drive shaft assembly can be considered as the driving end, with the opposite end being the driven end, while in all cases, the drive shaft can be quickly installed or removed or interchanged, preferably without the aid of tools or special equipment, or at least with the aid of only such tools or equipment as would normally be available under the existing working conditions.

When the drive shaft assembly has been contracted to the condition illustrated in FIG. 3, axial expansion of the drive shaft can be quickly restored by removing the retainer pin 18. The use of a separate selective retainer means of this type is especially desirable or necessary by reason of the fact that once the pin 12 has been removed to allow expansion of spring 9, the pin 12 cannot be reinserted through the apertures 11, 11 without fully recompressing the spring 9 with the aid of a press or other special tool which normally would not be available in the field. After once releasing the spring 9, the separate retainer means, of which the additional pin 18 forms a part, is preferably utilized should it become desirable to recompress the coil spring 9, under which conditions, the splined head 5 of the male shaft component 1 would assume a position obstructing the apertures 11, 11.

Drive shaft assemblies conforming to the present invention may be made in different basic lengths according to the various uses and machines or equipment to which they are intended to be applicable. Greater lengths can be readily achieved than that represented in the illustrative embodiment, as by increasing the length of the male shaft component, or the female shaft component, or both. Also, additional apertures or holes can be provided in the sleeve 6 of the female shaft component 2 and/or in the shank 4 of the male shaft component 1, corresponding to those designated 11, 11, 16, 16, and 17, respectively, with the apertures or holes suitably spaced apart to permit the drive shaft assembly to be retained in various positions of axial elongation or contraction through the use of retainer pin 18, and with the coil spring 9 in various conditions of compression or expansion, as desired.

While the specific details of my invention have been herein shown and described, it is to be understood that it is not confined thereto as other changes and alterations may be made therein without departing from the spirit thereof as defined by the appended claims.

I claim:

1. A drive shaft assembly, comprising a pair of telescopically interengageable rotary shaft components for arrangement in coaxially extended opposed relation and having means for establishing positive driving interconnection with each other, spring means operatively interposed between said shaft components when telescopically interengaged and serving to normally urge the assembled shaft components to assume an axially extended condition during operation thereof, while permitting yieldable axial contraction of said shaft assembly, and selective means for restraining the force of the spring means while permitting free telescopic movement of said shaft components independently of the spring means and for alternatively maintaining the shaft components in an axially contracted condition against the force of the spring means, respectively, at least one of said shaft components having a universal joint on the outer end thereof.

2. A drive shaft as defined in claim 1, wherein the shaft components respectively have the form of male and female parts, said male part being axially elongated and terminating in an externally splined end, and the female part having the form of an elongated sleeve which is open at one end and closed at its opposite end, said sleeve being correspondingly internally splined for a substantial portion of its length for slidably receiving the externally splined end of the male part aforesaid, and said spring means comprising a coil spring seated coaxially in the female part in a position substantially spaced inwardly from the open end of the sleeve and disposed for abutting engagement with the end face of the externally splined end of the male part when the male and female shaft components are telescopically assembled together.

3. A drive shaft assembly as defined in claim 2, wherein the female shaft component is provided with opposed and diametrically alined pin receiving apertures at a position along its length in which a pin inserted therethrough will abut and restrain the expansive force of the spring when the latter is substantially fully compressed axially.

4. A drive shaft assembly as defined in claim 2, wherein the female shaft component is provided with opposed and diametrically alined pin receiving apertures at a position along its length in which a pin inserted therethrough will abut and restrain the expansive force of the spring when the latter is substantially fully compressed axially, said female shaft component having additional opposed and diametrically alined apertures therein disposed in axially spaced relation to the first-mentioned apertures, and said male shaft component having an aperture extended diametrically therethrough and registrable with said additional opposed apertures in the female shaft component when the coil spring is substantially fully compressed axially while in abutting contact with the end face of the splined end of the male shaft component for receiving a restraining pin through the alined apertures of both shaft components.

5. A drive shaft as defined in claim 1, wherein the shaft components respectively have the form of male and female parts, said male part being axially elongated and terminating in an externally splined end, and the female part having the form of an elongated sleeve which is open at one end and closed at its opposite end, said sleeve being correspondingly internally splined for a substantial portion of its length for slidably receiving the externally splined end of the male part aforesaid.

References Cited in the file of this patent

UNITED STATES PATENTS

| | | |
|---|---|---|
| 1,292,842 | Mayner | Jan. 28, 1919 |
| 1,828,087 | Vlcek | Oct. 20, 1931 |
| 2,128,030 | Koleno | Aug. 23, 1938 |
| 2,468,182 | Dempsey | Apr. 26, 1949 |
| 2,556,380 | Stillwagon | June 12, 1951 |
| 2,598,780 | Garnier | June 3, 1952 |